United States Patent

Manikundalam et al.

[19]

[11] Patent Number: 6,058,414

[45] Date of Patent: May 2, 2000

[54] SYSTEM AND METHOD FOR DYNAMIC RESOURCE ACCESS IN AN ASYMMETRIC RESOURCE MULTIPLE PROCESSOR COMPUTER SYSTEM

[75] Inventors: Ravindranath Kasinath Manikundalam, Austin; Jayashree Ramanathan, Round Rock, both of Tex.

[73] Assignee: International Business Machines Corporation, Armonk, N.Y.

[21] Appl. No.: 09/004,135

[22] Filed: Jan. 7, 1998

[51] Int. Cl.[7] .................................................. G06F 9/00
[52] U.S. Cl. ............................................................ 709/104
[58] Field of Search .................................... 709/100, 101, 709/103, 104, 107

[56] References Cited

U.S. PATENT DOCUMENTS

| | | | |
|---|---|---|---|
| 4,677,546 | 6/1987 | Freeman et al. | 364/200 |
| 5,475,843 | 12/1995 | Halviatti et al. | 709/100 |
| 5,535,417 | 7/1996 | Baji et al. | 710/22 |
| 5,627,958 | 5/1997 | Potts et al. | 395/336 |
| 5,815,664 | 9/1998 | Asano | 709/227 |
| 5,907,704 | 5/1999 | Gudmundson et al. | 395/701 |
| 5,987,471 | 11/1999 | Bodine et al. | 707/103 |

*Primary Examiner*—Majid A. Banankhah
*Attorney, Agent, or Firm*—Marilyn Smith Dawkins; Mark S. Walker

[57] ABSTRACT

A system, method and program product enabling applications to be dynamically bound to resources as required by an application. Resource access exceptions are intercepted and, where access is authorized, cause the application to be bound to one of a plurality of processors linked in an asymmetric multiple processor configuration which has access to the resource required. If access is not permitted, an error is generated. Applications may invoke operating system application programming interfaces to register requirements for access to particular resources and to receive operating system feedback on resource assignment conflicts and potential processor thrashing situations. The operating system maintains a list of mapping processors to resources and manages the authorization of resource access by applications. Application processes are dynamically bound to a particular processor as necessary to meet resource requirements. Upon completion of access, the application process is unbound from the processor enabling it to bind to other processors as required for resource access or processor work load balancing.

14 Claims, 4 Drawing Sheets

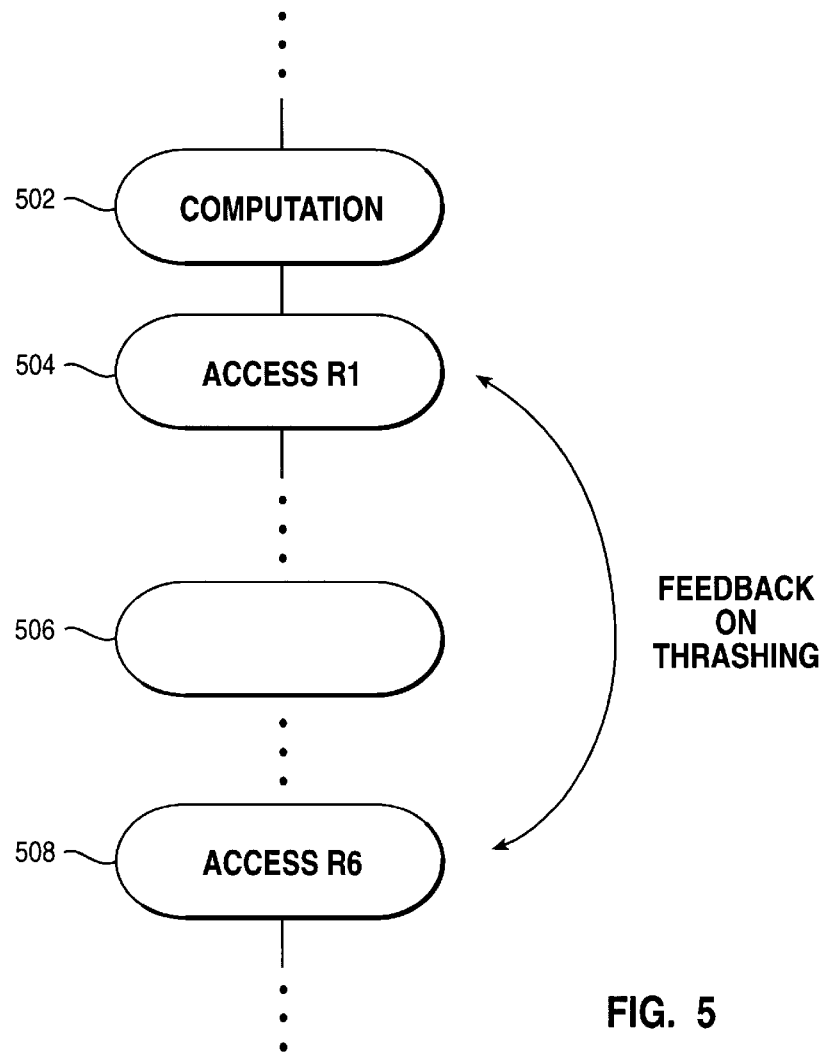

SYSTEM AND METHOD FOR DYNAMIC RESOURCE ACCESS IN AN ASYMMETRIC RESOURCE MULTIPLE PROCESSOR COMPUTER SYSTEM

BACKGROUND OF THE INVENTION

1. Field of the Invention

The present invention relates generally to multiple processor computer systems and more specifically to the assignment of resources to computer system processes. More particularly, the present invention relates to the dynamic assignment of input/output resources to application programs in an asymmetric multiple processor computer system in which input/output resources exist on a subset of the multiple processors.

2. Background and Related Art

Multiple processor computer systems are those in which more than one processing element or CPU is used to process a given workload. A multiple processor system may have two, four, or more processors within a computer cabinet or in several enclosures connected to form a single processing entity.

Symmetric multiprocessors (SMP) have shared memory that is accessible by all of the processors in the complex. Shared memory enables the task scheduling function of the system to assign a task to the processor that has the necessary resources for that task. Such resources may include input/output devices such as displays, printers, or communications devices. In a symmetric multiprocessing system the shared memory environment enables a task to be scheduled on a processor with a certain resource and later rescheduled through the shared memory to a different processor.

Asymmetric multiple processor systems contain resources that are physically attached to only a subset of the processors. An asymmetric system includes configurations such as clustered computer systems which may reside in different processor cabinets and be linked by a high speed bus or switching mechanism. The scheduler in prior art asymmetric multiple processor systems typically assigns an application to a processor having the resources required to complete the application execution. The application is statically bound to the processor with the resources. There is no provision for unbinding the application from a processor and there is no ability to reschedule the application process on a different processor with different resources during its execution.

An asymmetric multiple processor system according to the present invention is shown generally in FIG. 1 as 100. Computer processors C1–C3 102, 104, 106 each have certain resources attached R1–R7. Resource 1 108 is physically attached to processor C1 102. Only processor C1 can directly access or use resource 1 108. Indirect access to the resource is provided by, for example, sending an interprocess message to the processor with the required resource. Indirect access is costly to performance and much less desirable than direct access. The number of resources assigned to any one processor depends upon the particular system structure. A cluster of computer systems may have all resource attached to a single processor or they may be distributed evenly among the processors. The specific allocation of resources to processors is immaterial to the present invention.

Resources such as permament storage disk devices 120 can be shared among processors. The sharing of disk resources enables the processors to communicate and to cooperate in the execution of applications. The ability to be shared amongst processors depends on the type of resource. Typically, the input/output resources other than disk devices can only be attached to a single processor and cannot be shared between or among processors.

Prior art asymmetric multiprocessing systems have a technical problem in that static binding of applications to processors creates load balancing and performance problems. If several applications require access to a particular resource, e.g. R1 108, the processor C1 supporting that resource can become overloaded while the other processors in the complex lack work. This results in poorer system throughput due to the bottleneck of C1. A second problem arises when an application requires access to different resources on different processors. If a particular application requires the use of R1 108 and R3 110, a scheduling problem results. The prior art systems also do not effectively handle the case where less than all of the processors have access to a particular resource. If, for example, only two of the three processors were able to access a device, prior art asymmetric multiprocessing scheduling would enable only one processor to be statically bound to an application process and would not perform any load balancing between the subset of processors.

A technical problem therefore exists to develop a method and system to enable dynamic scheduling of applications and processes using resources that are shared by one or more, but less than all of the processors in an asymmetric multiple processor complex.

SUMMARY OF THE INVENTION

The present invention is directed to providing a method and system for dynamically assigning application processes to multiple processor elements able to directly access a resource. Scheduling an application process on the processor that has physical access to a resource is more efficient than providing logical access to the resource on another processor. The present invention maintains in the operating system a list of processors with the types of resources connected to those processors. Each executing application or process registers with the operating system to access a specific resource or I/O device. Upon completion of resource access the application deregisters indicating that access to the device is no longer required. The present invention also provides operating system notification to an application when the application's resource requirements could cause unproductive scheduling of tasks between processors or thrashing of the processors handling the application.

A system for dynamically binding an executable process to a resource in a computer system having two or more processors, the system including storing a mapping of resources to processors having access to those resources, means for intercepting an executable application process request for access to a resource, means for dynamically binding an executable application process to a processor having access to a resource.

It is therefore an object of the present invention to provide an operating system ability to determine the resources available on each processor in an asymmetric multiple processor complex.

It is another object of the present invention to provide dynamic binding of applications to processors having resources required by that application. It is yet another object of the invention to deregister and unbind the application from a processor when access to that processor is no longer required.

The foregoing and other objects, features and advantages of the invention will be apparent from the following more particular description of a preferred embodiment of the invention, as illustrated in the accompanying drawing wherein like reference numbers represent like parts of the invention.

BRIEF DESCRIPTION OF THE DRAWING

FIGS. 4(a) and 4(b) are illustrations of a resource registry and processors to resource mapping tables according to the present invention.

FIG. 5 is a flow chart depicting the process steps of an application executing in the system according to the present invention.

DETAILED DESCRIPTION

Figure 1:
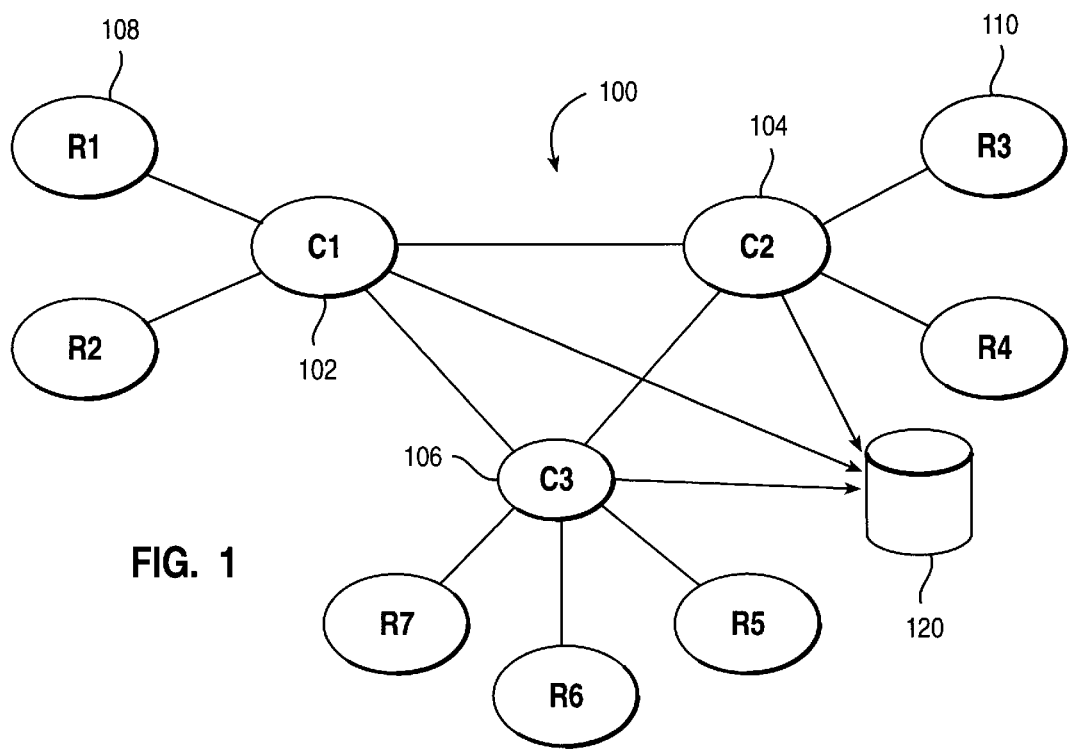
FIG. 1 is a block diagram illustrating an example of an asymmetric multiple processor complex according to the present invention.
Figure 2:
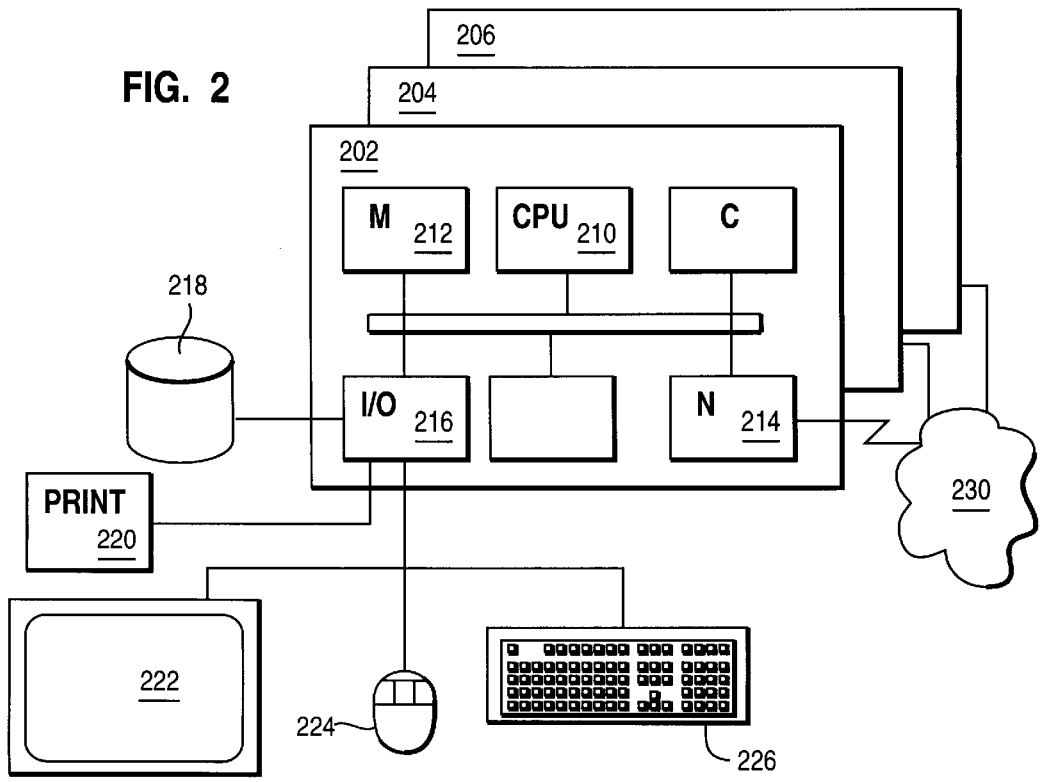
FIG. 2 is a block diagram illustrating the processor components in a processor in an asymmetric multiple processor complex.

An asymmetric multiple processor system includes two or more processing resources or CPUs that contain resources not physically attached to all processors. A generalized layout of such a system is shown in FIG. 1. Each of the computer systems connected to form the asymmetric multiple processor will have at least a CPU 210 memory 212 and network or communications connectivity 214. In addition, one or more of the processor complexes will have an I/O controller 216 which may be connected to permanent or removable storage media 218, a printer 220, and display mouse and keyboard 222, 224, 226. The network controller will connect the processor complex 202 to other processor complexes 204 and 206 through interconnection means 230 which may be a network, bus, or switch type of interconnection. Any number of processor complexes can be connected in this way limited only by the ability of the operating system to manage the complex.

The execution of applications in an asymmetric multiprocessing system is controlled by the operating system. An "application" includes all types of processing by the computer system including functions of the operating system itself as well as user defined tasks or processes for accomplishing a certain result. The operating system for an asymmetric multiple processor operates in the memory 212 of one or more of the processing complexes. The operating system for an asymmetric multiple processor system must include logic for scheduling application processes on the various processor complexes and for managing the communication of processor requests and requirements between the processing elements.

Figure 3:
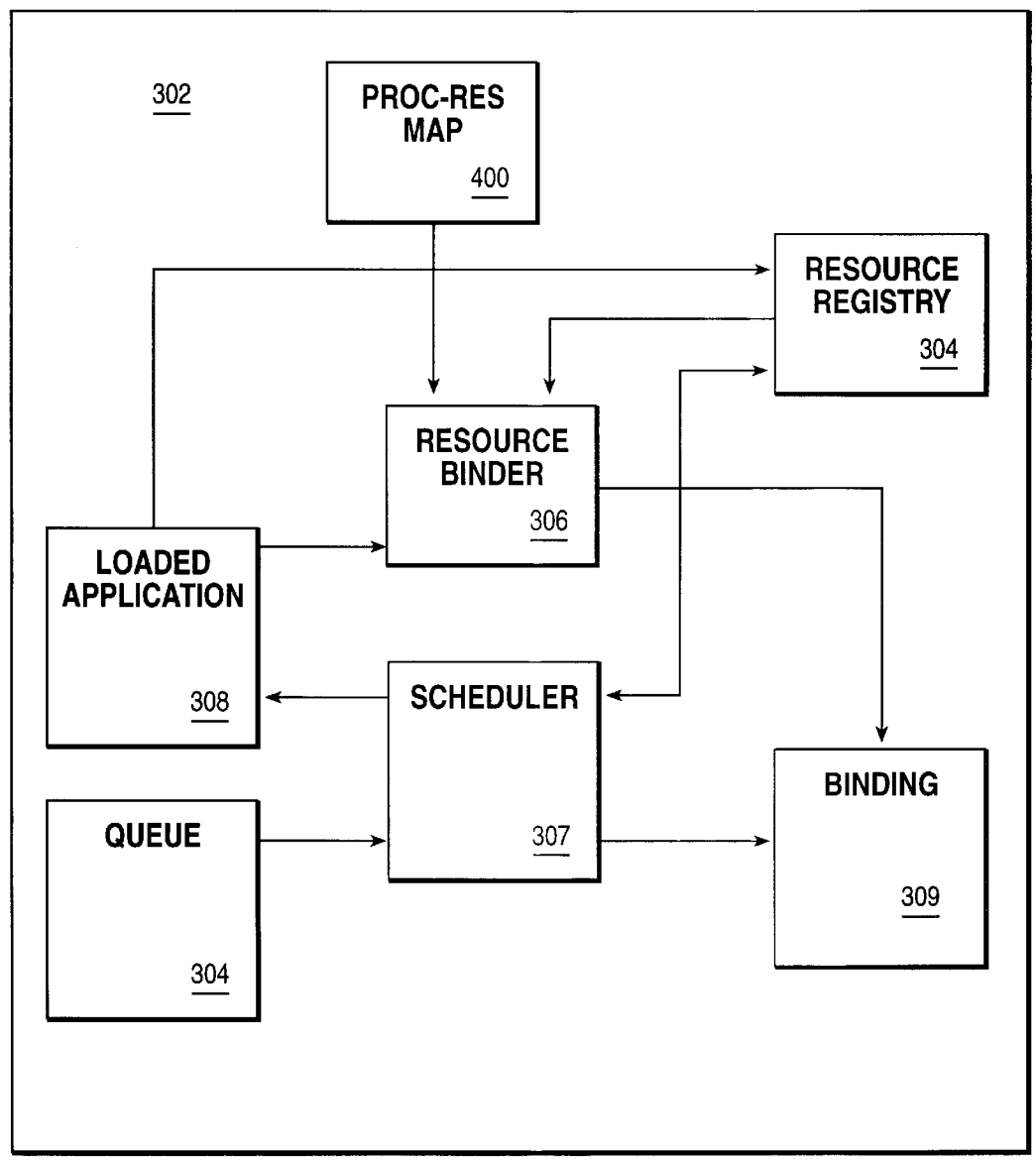
FIG. 3 is an illustration of the processes and the memory of a computer system according to the present invention.

The operating system executing in the memory of an asymmetric multiple processor complex is shown in greater detail in FIG. 3. Only the components of the operating system of interest to the present invention are described. These components reside generally in the memory 302 of a processor complex. Applications waiting for execution are maintained in the queue 304. The processor task scheduler 307 determines the application to be executed based on the priority and other scheduling algorithms that do not form a part of this invention. The scheduler loads an application into the loaded application area 308.

The operating system according to the present invention, is modified to maintain a record of processors that have access to each resource. Resources include input/output (I/O) devices and other devices which can be accessed by less than all of the processors in a multiprocessor complex. The operating system maintains a resource table 400 that maintains a list of processors from which each resource or I/O device may be accessed. The list is dynamically updated based on the addition or deletion of processors with access to a resource. A resource registery (FIG. 4(b)) is maintained which maps applications to the resources they need. A privileged operating system entity handles the registration and updates of the resource registry and applies device authorization information to control the access to that resource.

The present invention is practiced in connection with an operating system such as the IBM OS/2 Operating System or the IBM AIX Operating System. These operating systems run on a variety of computers including computer processors from the Intel Corporation, PowerPC Microprocessors from IBM Corporation and other types of microprocessors. The present invention is not limited to a particular operating system or particular processor and can be implemented in the processing logic for various operating systems. The present invention is therefore extendible to operating systems such as the UNIX Operating System, the MacIntosh Operating System, the Microsoft Windows Operating System, and others.

The present invention implements an operating system application programming interface (API) that enables an application or process to designate the resources required for that application. The application can register to access a resource in the registry 304. Upon completion of resource use, the application invokes a second API to deregister the application from the resource.

An application is bound to a particular processor and resource based on the requirements of that application. Access to the resource or device is granted or denied based on the privileges held by an application. Binding occurs dynamically when the application requires access to the resource. For example, an attempt to access an unbound resource will cause a fault to an I/O port or I/O memory area (a "port fault" or a "memory fault"). This fault is intercepted and processed by the resource binder 306 which dynamically binds the application to the processor having the required resource as depicted in the processor resource map 400. It also updates the resource registry entry for the application. In contrast to prior art systems, the application is not statically bound to that processor and once resource access is completed, the application deregisters indicating that the resource is no longer needed and can be bound to other processors as required.

If more than one processor can access a particular device the operating system resource binder schedules the application to the least busy processor.

The applications may also indicate to the resource registry that no resources are required thereby enabling the application to be scheduled on any processor without regard to processor resource connections.

The flow of execution for a particular application is shown generally in FIG. 5. The application performs certain computations 502 until an attempt is made to access resource 1 450. This access will cause an exception to be raised (a fault) and binding to occur as discussed above. Additional computation 506 and additional accesses 508 can occur during the life of the process until it is terminated.

The operating system analyzes the resource requirements presented to the resource registry 304 and provides feedback on thrashing to the application process. Thus, if resource 1 and resource 6 are on different processors and the application logic repeatedly accesses one then the other of the resources this could cause the application to first be scheduled on one processor then move to a second causing thrashing back and forth between the processors consuming significant processor time in scheduling rather than in productive computation activity. The present invention provides APIs that enable the application to recognize such thrashing and provide feedback to the developer to enable tuning of the application to avoid or minimize switching between processors.

When an application registers to access a resource the operating system registry 304 ensures that the application is authorized to access those resources. The registry is a privileged entity that enforces resource access authorizations. When an application is granted access to a resource the local kernel updates applications resource authorization information but does not bind the application to any given processor.

Figure 6A:
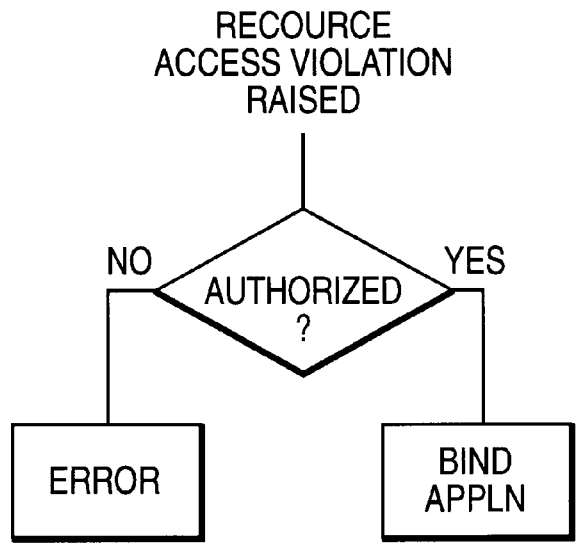
FIGS. 6(a) and 6(b) illustrate flow charts of application process to resource binding according to the present invention.
Figure 6B:
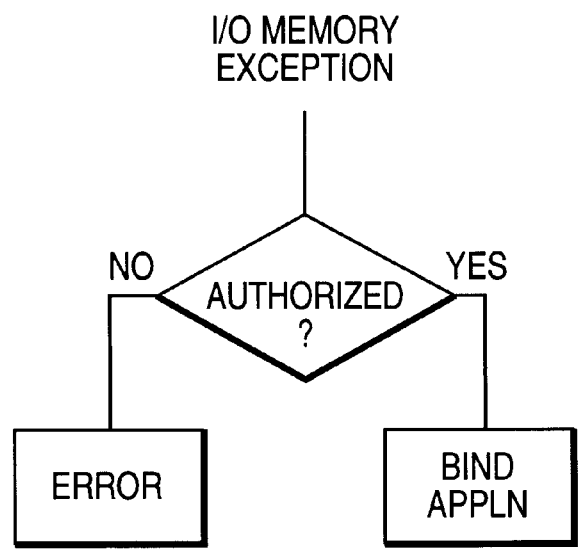

An I/O device as an example of a resource that will be used in the following discussion. Access to an I/O device is typically through an I/O port known to the application or by accessing a specific memory location that is mapped to the I/O device. Since the application according to the present invention has not been bound to a processor or device, it does not have access to the needed I/O port or memory area. Application access to the I/O port or memory area it will raise an exception or fault and the processor will provide to the operating system exception handler one of the following exceptions including the invalid address accessed: (1) invalid port access when the processor does not recognize the I/O port; (2) unprivileged port access when the processor recognizes the I/O port, but the application is unauthorized to access this port. The processor generates an invalid memory access when the processor is unable to access a particular memory address. No exception occurs when an authorized application executes an instruction on the I/O port or I/O memory of a device when this application is scheduled on a processor which can access this device. When an invalid port access occurs but the application is authorized to access the address in question, the operating system binds the application to one of the processors that has access to the address in question. When an unprivileged port access occurs and the application is not authorized to access the address an application error is raised. When an invalid memory address access occurs and the physical memory address corresponds to a device I/O memory but the application is authorized to access that memory, it is bound locally to one of the processors that has access to the requested memory. If the application is not authorized to access the address in question an application error is raised. This processing logic is shown generally in FIGS. 6(a) and 6(b).

Implementation of the present invention in a computer system requires modifications to the process scheduling logic, to the port and memory exception handling logic and to the logic for assigning processes to processors in an asymmetric multiple processor complex. The present invention is implemented as a method or system for performing the above functions. In the preferred embodiment it is formed as a computer program product stored on a computer readable medium for causing an asymmetric computer system to perform the above-identified functions.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed:

1. A system for dynamically binding an executable process to a processor that has physical access to a resource in a computer system having two or more processors and a plurality of resources physically accessible from less than all of said processors, the system including a memory area for storing a mapping of resources to processors having access to those resources;

means for intercepting an executable application process request for access to a resource;

means for dynamically binding said executable application process to a processor having access to a resource according to said stored mapping.

2. The system of claim 1 wherein the resource is an input/output device.

3. The system of claim 1 further comprising:

means for receiving an executable application process request for access to a resource.

4. The system of claim 3 further comprising:

means for verifying access authority before dynamically binding said executable application process to a processor.

5. The system of claim 1, further comprising:

a second memory area for storing application resource registrations;

means for registering in said second memory area, a list of resources required by an executable application;

means for deregistering in said second memory area when said application no longer requires access to a resource.

6. A method for dynamically assigning an executable application process to a computer processor in an asymmetric multiple processor computer system, the method comprising the steps of:

maintaining an association of resources with processors having access to those resources;

intercepting unsuccessful resource access attempts by an executable application process;

testing to determine whether said application process is permitted access to said resource;

binding said application process to a processor identified by the processor to resource association to enable continued execution if said process is permitted access.

7. The method of claim 6 further comprising the step of:

removing the binding of the application process to the processor when application access is terminated.

8. The method of claim 6 further comprising the steps of:

registering a set of application process resource requirements with an operating system.

9. The method of claim 8 further comprising notifying an application program when application process resource conflicts exist.

10. A computer program product having a computer readable medium having computer program logic recorded thereon for dynamically assigning an executable application process to a processor in an asymmetric multiple processor system, the computer program product comprising:

computer program product means for storing a mapping of resources to processors having access to those resources;

computer program product means for intercepting an executable application process request for access to a resource; and computer program product means for dynamically binding said executable application process to a processor having access to said resource according to said stored mapping.

11. The computer program product of claim 10, wherein the resource requested is an input/output device.

12. The computer program product of claim 10, further comprising:

computer program product means for receiving an executable application process request for access to a resource.

13. The computer program product of claim 10, further comprising:

computer program product means for verifying access authority before dynamically binding said executable application process to a processor.

14. The computer program product of claim 10, further comprising:

computer program product means for registering in a second memory area, a list of resources required by an executable application;

computer program product means for deregistering in said second memory area when said application no longer requires access to a resource.

* * * * *